Figure 1:
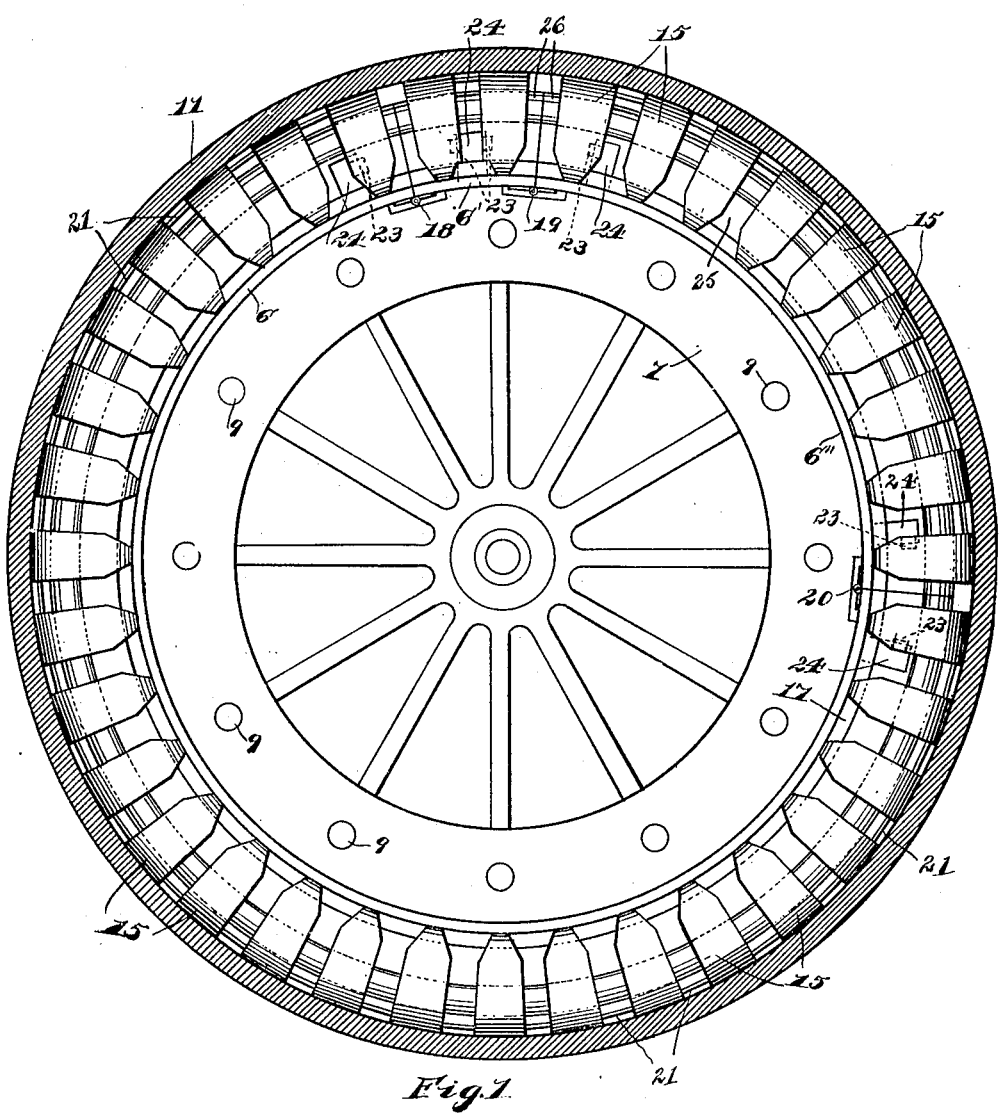

A. PAROLI.
RESILIENT WHEEL.
APPLICATION FILED JUNE 26, 1917.

1,291,627.

Patented Jan. 14, 1919.
2 SHEETS—SHEET 1.

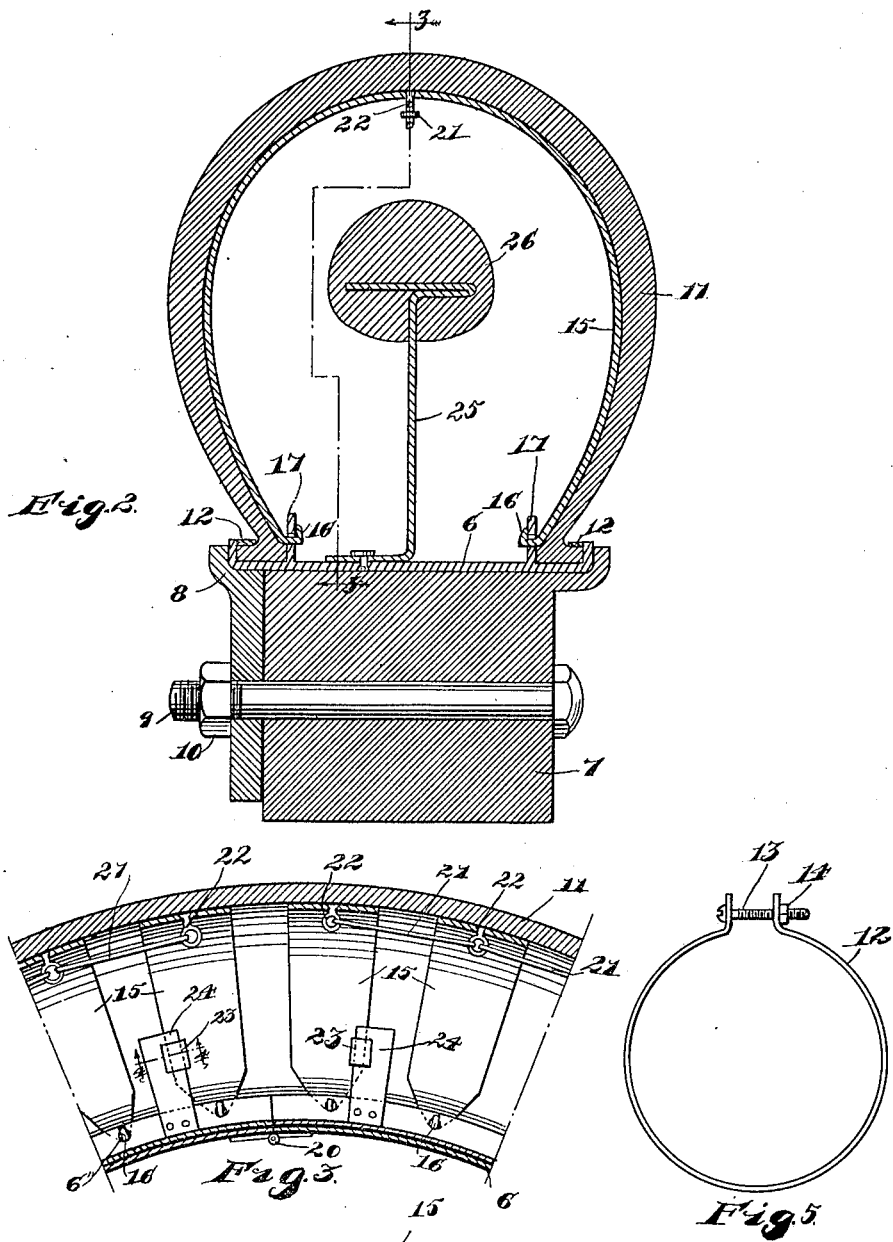

UNITED STATES PATENT OFFICE.

ANGELO PAROLI, OF CHICAGO, ILLINOIS, ASSIGNOR OF ONE-HALF TO ORESTE TARDELLA, OF CHICAGO, ILLINOIS.

RESILIENT WHEEL.

1,291,627.  Specification of Letters Patent.  Patented Jan. 14, 1919.

Application filed June 26, 1917. Serial No. 176,990.

*To all whom it may concern:*

Be it known that I, ANGELO PAROLI, a subject of the King of Italy, and a resident of the city of Chicago, county of Cook, and State of Illinois, have invented certain new and useful Improvements in Resilient Wheels, of which the following is a specification.

My invention relates to improvements in resilient vehicle wheels, and more particularly to demountable tires for vehicle wheels designed to supplant the conventional pneumatic tire, with the advantage over the conventional pneumatic tire of the present construction being non-puncturable and possessing greater durability than the pneumatic tire.

Other objects will appear hereinafter.

The invention consists in the combinations and arrangements of parts hereinafter described and claimed.

The invention will be best understood by reference to the accompanying drawings forming a part of this specification, and in which, Figure 1 is a side elevation of a resilient vehicle wheel embodying the invention, the tire casing being shown in section, Fig. 2, an enlarged transverse section through the tire and felly of the wheel as seen in Fig. 1, Fig. 3, a reduced section taken on line 3—3 of Fig. 2, Fig. 4, a detail section taken on substantially line 4—4 of Fig. 3, and Fig. 5, a side elevation of one of the clamping bands used in connection with the tire.

The preferred form of construction as illustrated in the drawings comprises an annular rim formed of three sections, 6, 6' and 6''. Said rim is adapted for removable mounting in the ordinary manner upon the felly 7 of a conventional vehicle wheel, said rim being adapted to be locked to said felly by dogs or keepers 8 with which coöperate securing bolts 9 and nuts 10 threaded thereon.

Mounted upon the rim is the tire casing 11 the flanged edges of which are mounted in the outer side of said rim and detachably secured thereto by means of split clamping rings 12, the ends of which are adjustably connected by screws 13 and coöperating nuts 14, as seen in Fig. 5. The casing 11 may of course be readily and easily removed from the rim by detachment of the clamping members 12.

The casing 11 is held in distended condition by means of filler members 15 which are arranged within said casing. Each of said filler members consists of a flat spring which is bent upon itself into substantially U-shape, the ends of the spring being reduced and engaged with perforations or slots 16 formed in annular flanges 17 which project outwardly from the rim. The flanges 17 also serve the function of holding the edges of the casing 11 in position, said edges, as seen, being imprisoned between said flanges and the sides of the rim.

The rim is formed of a plurality of sections 6, 6' and 6'' as mentioned, in order to permit of ready insertion of the filler members carried thereby within the casing of the tire. Said sections are hingedly connected at 18, 19 and 20, as clearly seen in Fig. 1, and in the insertion of the device into a tire casing, the section 6' is completely detached from the sections 6 and 6'' by removal of the pintles of the hinges 18 and 19. The outer side of the felly 7 is notched or cut away, as seen in Fig. 1, to accommodate said hinges. In inserting the device into a tire casing, the section 6 is first inserted into one side of the casing, whereupon the section 6'' is rocked into position. This having been done, the section 6' is inserted to position between the spaced ends of the sections 6 and 6'', said sections 6' being then locked in position by reinserting the pintles into engagement with the interlocked leaves of hinges 18 and 19, thus connecting the adjoining ends of the sections together.

The outer or bight portions of adjacent springs 15 are loosely connected together by means of links 21 which engage with eyes or loops 22 provided at the outer portions of said springs, as clearly seen in Fig. 3. This connection of said springs serves to retain the springs in their spaced relation and at the same time to connect the same together in such a manner as to establish coöperative relation so that when one spring is compressed, adjacent springs will also be moved to compression, and thus obviate the possibility of one or a few springs bearing all of the strain or weight to which the tire is subjected when in use.

In order to lock the springs against relative tilting movement upon the rim, the terminal spring members upon each section of the rim are formed with inwardly extending lips or ears 23 which are adapted to engage against posts 24 arising from the rim, as clearly seen in Fig. 3.

Arranged centrally upon the rim is an outwardly extending resilient flange 25 which carries at its outer edge an enlarged head or bead 26 of rubber or other cushioning material. With this arrangement, in case of excessive compression of the tire, the outer portions of springs 15 will contact with the member 26 which will thus serve as a supplemental reinforcement or buffer which will avoid fracture of the springs 15 as might otherwise result from excessive bending or flexing of the same.

A tire of the construction set forth, will be found to possess resiliency equal to that of a pneumatic tire, but at the same time will be proof against blow-outs and punctures. When the casing wears out, the same may be removed and the filler portion of the device inserted into a new tire casing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In a resilient tire for vehicle wheels the combination of a wheel rim; a casing mounted on said rim; a filler in said casing comprising a plurality of spaced transversely disposed arched springs, having loosely fastened ends; and means for holding said springs against relative pivotal movement, said holding means comprising stops projecting outwardly from said rim and engaging with certain of said springs, substantially as described.

2. In a resilient tire for vehicle wheels, the combination of a wheel rim; a casing mounted on said rim; a filler in said casing comprising a plurality of spaced transversely disposed arched springs having their ends loosely engaging said rim; means for holding said springs against relative pivotal movement, said holding means comprising stops projecting outwardly from said rim and engaging with certain of said springs; and an operative connection between said certain springs and the remainder of said springs, substantially as described.

3. In a resilient tire for vehicle wheels, the combination of a sectional wheel rim, the sections of which are detachably connected together; a plurality of spaced transversely disposed arched springs carried by each rim section and having their ends loosely secured thereto; means for holding the springs of each section against pivotal movement, said holding means comprising stops projecting outwardly from each rim section engaging with the terminal springs of each section; and an operative connection between said springs of each rim section and the remaining springs thereof, substantially as described.

In testimony whereof I have signed my name to this specification in the presence of two subscribing witnesses.

ANGELO PAROLI.

Witnesses:
JOSHUA R. H. POTTS,
B. G. RICHARDS.

Copies of this patent may be obtained for five cents each, by addressing the "Commissioner of Patents, Washington, D. C."